UNITED STATES PATENT OFFICE.

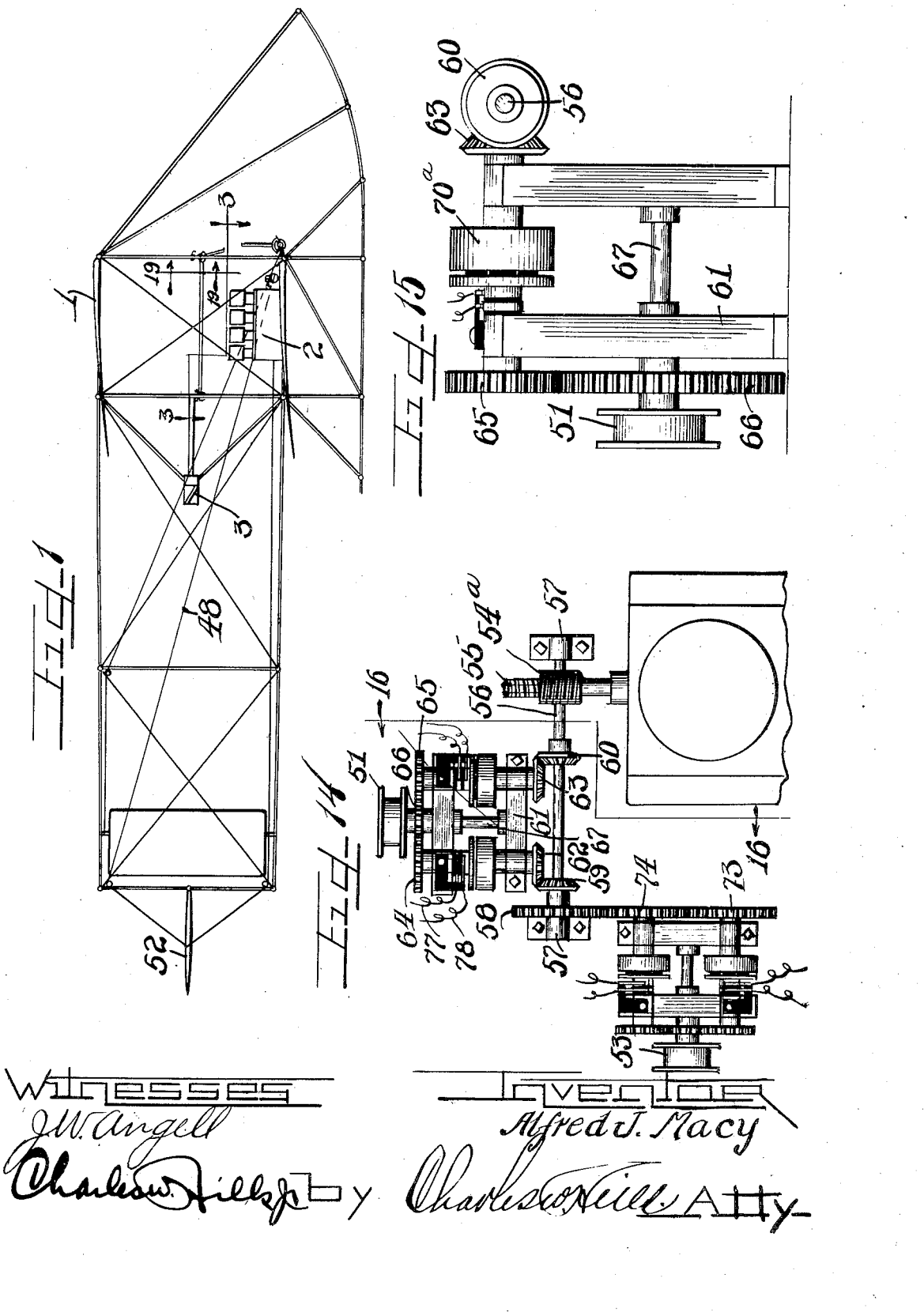

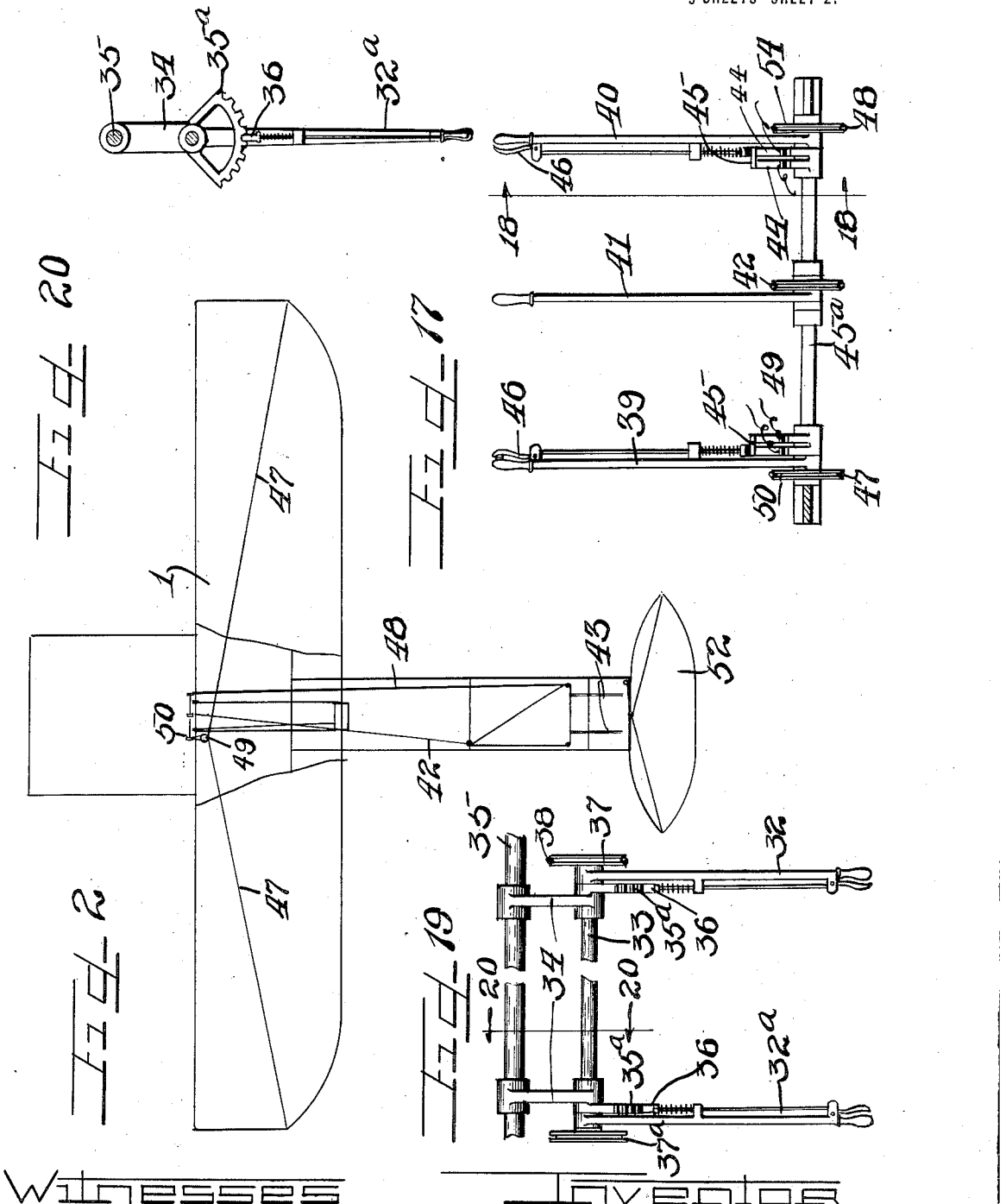

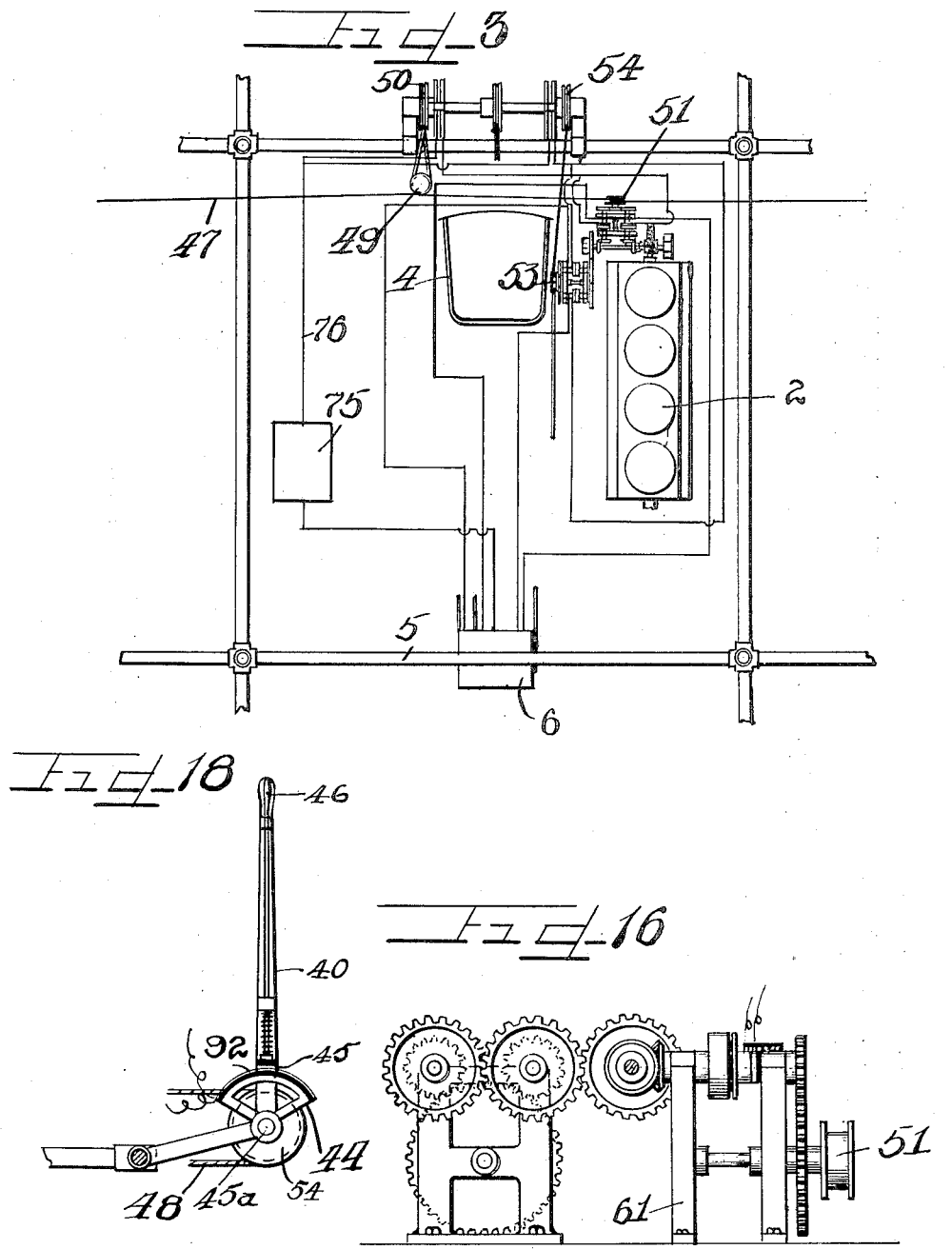

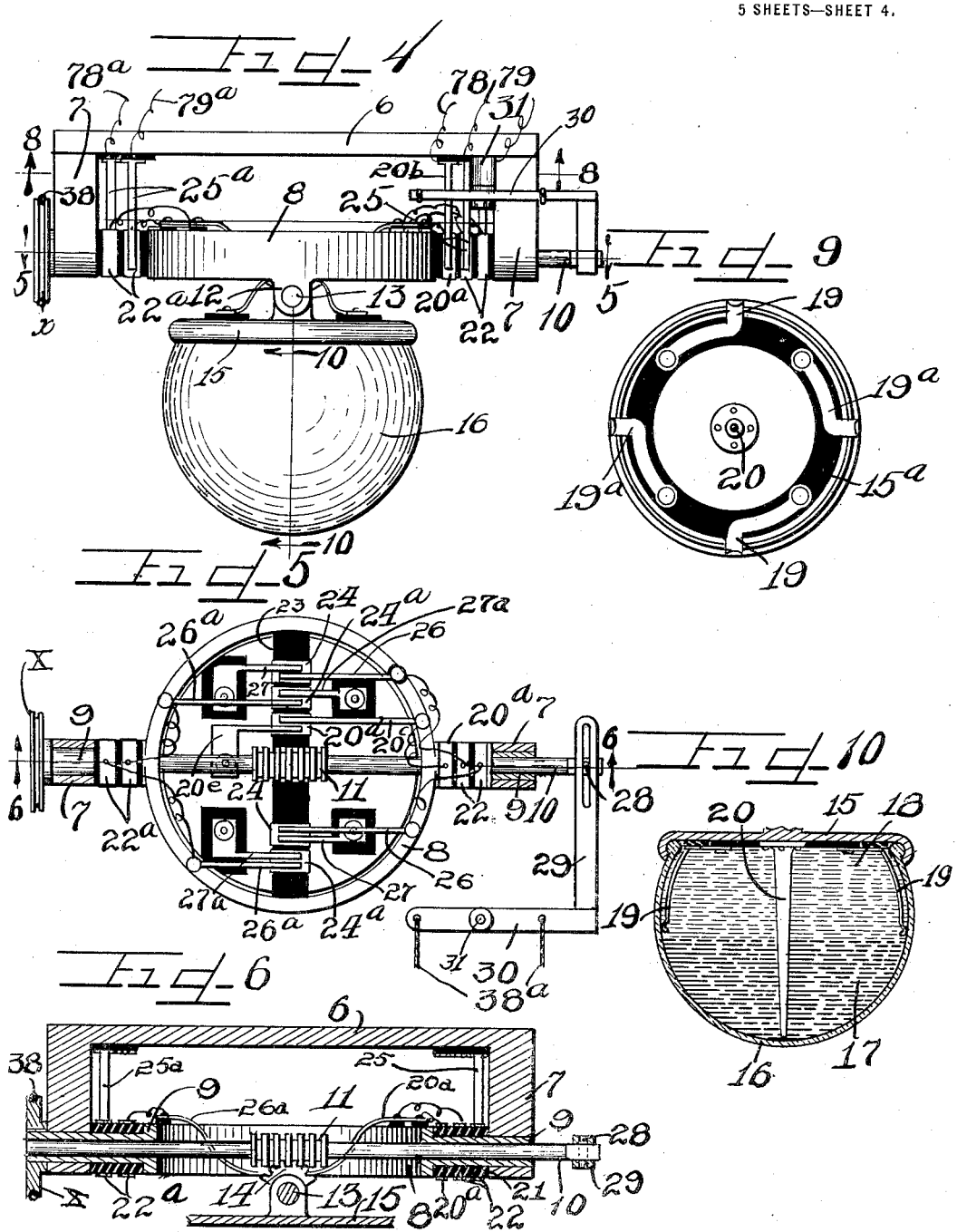

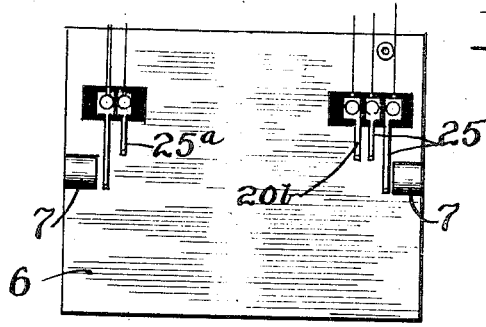
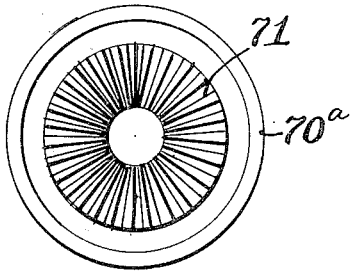
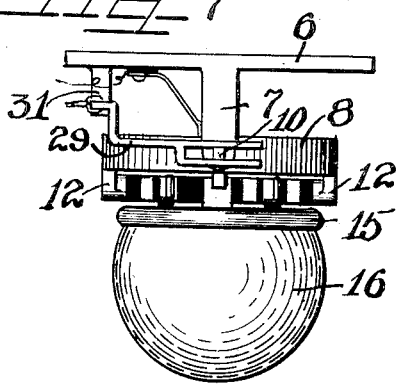
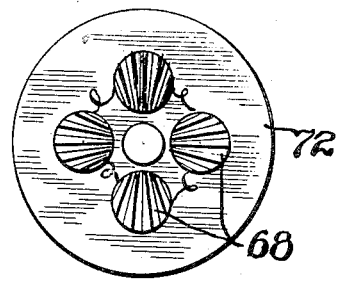
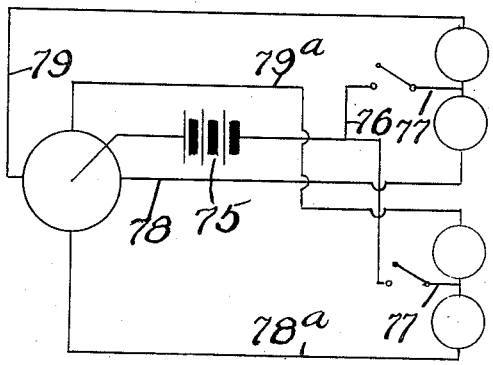
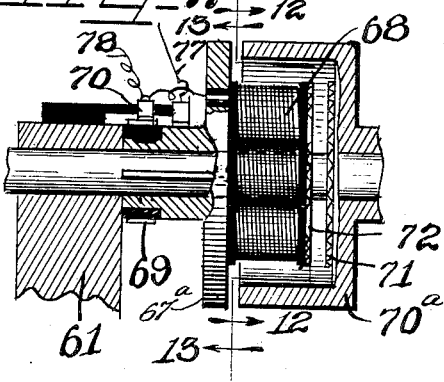

ALFRED J. MACY, OF CHICAGO, ILLINOIS.

AUTOMATIC CONTROLLING AND STABILIZING MECHANISM.

1,203,218.  Specification of Letters Patent.  Patented Oct. 31, 1916.

Application filed January 27, 1913. Serial No. 744,556.

*To all whom it may concern:*

Be it known that I, ALFRED J. MACY, a citizen of the United States, and a resident of the city of Chicago, in the county of Cook and State of Illinois, have invented certain new and useful Improvements in Automatic Controlling and Stabilizing Mechanisms; and I do hereby declare that the following is a full, clear, and exact description of the same, reference being had to the accompanying drawings, and to the numbers of reference marked thereon, which form a part of this specification.

This invention relates to improvements in devices for insuring stability and maintaining equilibrium of self-propelled devices, such, for example, as aeroplanes or flying machines of any type, or even submarine vessels and torpedo boats.

The invention (for convenience of illustration) is shown embodied and installed upon a biplane, although it will be evident that it is applicable to many other devices and uses.

The operation of all flying machines has, of course, up to the present time, been accompanied with numerous dangers, both to the structure and the operator, to which other than air supported vehicles are not subjected. The loss of life in the last few years has been enormous among the operators and users of aeroplane devices in proportion to the number of men so employed. Accidents are frequent and numerous, and almost invariably are fatalities. These accidents are occasioned in various ways. Sometimes, it is true, by structural failure or the recklessness or inexperience of the operator, but more frequently accidents are occasioned from causes beyond his control. Sometimes momentary faintness of the operator causes him momentarily to lose control of the machine with fatal results; sometimes fatigue, due to the excessive nervous and muscular strain necessary to maintain the stability and equilibrium of the machine causes a moment's lapse or release, with fatal results. In numerous instances, the operator when in air, finds it necessary to effect some adjustment of the engine or some part of the machine, but is unable to do so because unable to vary his position, or to release the controlling levers to permit him so to do, and in such cases, the operator is indeed fortunate who has within the range of volplaning flight, a landing place to which he may descend without destruction.

The object of this invention is to afford a device adapted to be set by the operator to determine and control the angle of inclination when ascending, or when volplaning in descent, and which, when once set,, will act to positively hold and retain the angle of inclination determined upon by the operator until readjustment is effected by the operator.

It is also an object of the invention to afford a construction whereby the device may be set to afford a lateral adjustment either in wing warping or in adjusting the ailerons or the tail for spiral flight, the machine on such adjustment maintaining the desired inclination and, lateral adjustment due to the automatic action of the stabilizing device.

It is a further object of the invention to afford operative means whereby the stabilizing mechanism may at the will of the operator, be released from control to permit the operator to control the machine manually when desirable.

It is a further object of the invention to afford a construction whereby lateral stability is positively and automatically assured at all times, without the assistance of the operator by affording means for suitably warping the wings, operating the ailerons or other mechanisms for maintaining lateral stability without the aid of the operator, and which may be immediately thrown out of action by the operator when desired, to vary the flight.

It is an object of the invention to afford a construction adapted for use in maintaining automatic and longitudinal stability automatically on any device or vehicle in which longitudinal and lateral stability is desirable.

It is an important object of this invention to enable the propelling motor or engine to actuate the controlling mechanisms.

It is to be understood that the object of the invention is to afford mechanism for regulating and controlling longitudinal inclination, and also lateral inclination for any vehicle requiring such control, for example, those movable in the air or upon or in the water.

It is also an object of the invention to provide an automatic stabilizing device for aeroplanes adapted to be actuated by the motor used in propelling the aeroplane and to be regulated and controlled by a series of magnetic clutches.

It is finally an important object of the invention to provide a cheap, simple and durable device which will not readily get out of order, and which will greatly simplify the operation of the vehicles to which it is attached as well as insure the utmost safety to the occupant of the vehicle while in transit.

The invention (in a preferred form) consists in the matters hereinafter described and more fully pointed out and defined in the appended claims.

In the drawings: Figure 1 is a side elevation of a biplane equipped with mechanism embodying my invention. Fig. 2 is a diagrammatic top plan view thereof. Fig. 3 is a section taken on line 3—3 of Fig. 1, with parts omitted. Fig. 4 is an enlarged side elevation of a device embodying my invention. Fig. 5 is a fragmentary section taken on line 5—5 of Fig. 4. Fig. 6 is a section taken on line 6—6 of Fig. 5. Fig. 7 is an end elevation of the device shown in Fig. 4. Fig. 8 is a section taken on line 8—8 of Fig. 4. Fig. 9 is a view of the under side of the cover plate 15. Fig. 10 is a fragmentary vertical section taken on line 10—10 of Fig. 4. Fig. 11 is a fragmentary detail of one of the magnetic clutches partly in section and partly in elevation. Fig. 12 is a view taken on line 12—12 of Fig. 11. Fig. 13 is a view taken on line 13—13 of Fig. 11. Fig. 14 is a top plan view of the transmission mechanism. Fig. 15 is a side elevation of one of the groups of the transmission mechanism. Fig. 16 is a section taken on line 16—16 of Fig. 14. Fig. 17 is a front elevation of the aeroplane control levers. Fig. 18 is a view taken on line 18—18 of Fig. 17, showing one of the adjusting levers. Fig. 19 is an enlarged section on line 19—19 of Fig. 1, illustrating a front elevation of the shifting levers for the stabilizing element. Fig. 20 is a fragmentary section taken on line 20—20 of Fig. 19. Fig. 21 is a diagrammatic view of a wiring plan embodying my invention.

As shown in the drawings, the biplane indicated as a whole by 1, (which is only intended for conventional illustration, as obviously the invention may be used on any type of vehicle) is of the Wright type, equipped with an engine 2, driving the usual propeller or propellers 3. The operator's seat 4, is located as usual for the particular type of machine used, and in convenient access thereto are the usual operating and controlling levers, which, in the particular embodiment of the structure illustrated in the drawings, will be hereinafter more fully described.

Mounted upon any convenient part of the machine frame, for example, the horizontal frame bar 5, is the stabilizing device. As shown, a supporting frame or plate 6, is secured on said bar and is provided with downwardly directed apertured lugs 7, on each side of the same. An oscillatable ring 8, is supported between said downwardly directed lugs 7, by means of tubular trunnions 9, which extend into and are rotatably engaged in the apertures in said lugs.

Journaled in the tubular trunnions 9, and adapted to slide therein, is a slide bar 10, which is provided thereon at the middle, with a cylindrical rack 11. Said oscillatable ring 8, is provided with downwardly depending lugs 12, in axial alinement with one another and at right angles with the axis of the tubular trunnions 9. Journaled in said lugs 12, is a shaft 13, to which is keyed a gear segment 14, adapted to mesh with said cylindrical rack 11. Also secured on said shaft 13, is a cover plate 15, provided with a peripheral inturned flange adapted to receive the upper beaded edge of the bowl 16, to seal and support the same. Said bowl 16, is preferably of non-conducting material and is partially filled with a liquid conductor, in this case mercury, 17, above which, and completely filling the bowl, is a non-conducting liquid such as oil 18. The under side of said cover plate 15, is provided with a circular insulating ring 15$^a$, and mounted thereon to depend therefrom, and separated at an angle of 90 degrees apart, are the contact fingers 19, and 19$^a$, each insulated from the other. As shown in Fig. 10, said fingers depend downwardly in the bowl to a point just above the level of the mercury. Extending downwardly from the center of said cover plate and immersed in the mercury, is the central contact finger 20.

As shown in Fig. 6, it will be seen that the tubular trunnions 9, are surrounded with an insulating bushing 21, and spaced therealong and insulated from each other, are the contact rings 22, 22$^a$, and 20$^a$ respectively. Said shaft 13, is also covered with insulating material 23, for a portion of its length, and spaced therealong and secured thereon are the contact rings 24 24$^a$ and 20$^d$. Secured on the plate 6, and insulated therefrom are the fingers 25 and 25$^a$, which bear upon the rings 22 and 22$^a$ respectively, in electrical contact therewith. Also insulated, and mounted upon one of the bushings 21, is the contact ring 20ª, which is contacted by the depending finger 20ᵇ, insulated and mounted upon the plate 6. Said ring 20ª, is in electrical connection with the finger or brush 20ᶜ, which bears upon the insulated ring 20ᵈ, on the shaft 13. Grounded on the cover plate 15, is the brush 20ᵉ, which affords electrical communication to the central finger 20, secured thereon. Said rings 22 and 22ª, are each respectively connected by means of a wire with the contacting fingers 26 and 26ª, which are insulated, and mounted upon the oscillatable ring 8. Bearing upon the rings 24 and 24ª, are the fingers 26 and 26ª, respectively, and also the fingers 27 and 27ª, mounted on the cover 15, and insulated therefrom, and in electrical connection with the contact members 19 and 19ª respectively. Thus it will be seen that the bowl 16, is movable about two horizontal axes at right angles to one another, the contact fingers and rings and the respective shafts therefor providing a means of continuous electrical contact regardless of the position of the bowl and without distortion or twisting of any of the electrical connections.

In order to move the bowl 16, about either one or both of the axes, one of the trunnions 9, is provided at its end with a pulley or sprocket X, which is keyed thereto, while one end of the slide bar 10, is provided with a projecting lug 28, engaging in a slot in the arm 29, of a bell crank, the other arm 30, of which is conveniently mounted upon a pivot 31, secured to the plate 6. The pairs of contact fingers 19 and 19ª respectively, extending downwardly in the mercury bowl 16, are in the same vertical plane with the aforementioned shafts 9 and 13, forming the gimbal mounting for said bowl, so that oscillation of the same about either one or both of said shafts, will cause the mercury to contact one of the pairs of fingers 19, or 19ª, or both as the case may be.

Mounted in a position for convenient operation by the operator, are the levers 32 and 32ª, shown as journaled on and supported by a shaft 33, which is in turn supported by the depending arms 34, secured to a cross-strut member 35, of the vehicle frame. Integral with said depending arms 34, are gear segments 35ª, adapted to be engaged by the spring pressed detent 36, connected to the levers 32 and 32ª, respectively, for the purpose of setting said levers in any desired adjustment. Also rigidly connected to each of said levers are the pulleys or sprockets 37 and 37ª respectively, and trained about the former and the pulley or sprocket X, is a cable or chain 38, adapting the equalizing bowl to be set at any desired angle of inclination about an axis running transversely of the machine.

Trained about the pulley 37ª, and with its ends connected with the arm 30, on either side of the pivot of the bell crank, is the cable or chain 38ª, adapting the stabilizing bowl, by means of the slide bar 10, and the cylindrical rack and pinion before described, to be set at any desired angle about an axis longitudinally of the machine.

Mounted in the usual position upon the machine, are the control levers 39, 40 and 41, of which the lever 39, is adapted to control the ailerons or warping surfaces to control the lateral inclination of the machine, while the lever 40, is connected to the elevator 52, or other mechanism for controlling the longitudinal angle of inclination of the machine. Connected to the lever 41, by means of the cable 42, are the vertical rudders 43, adapted to guide the machine in a horizontal plane, as is usual. Means are provided on each of the levers 39 and 40, respectively, for making and breaking the electrical circuit forming a part of the stabilizing mechanism for the purpose of operating the machine either with or without said mechanism, if so desired. For this purpose a pair of quadrant members 44, are mounted adjacent the levers 39 and 40, on the shaft 45ª, affording the pivotal support for the levers 39, 40 and 41 respectively. Said quadrant members comprise two parallel arc shaped members, insulated from, and parallel one to another. Said levers 39 and 40, are each provided with spring pressed insulated bridge contact members 45, adapted when in the normal or released position to bear upon each of the members 44, affording an electrical connection therebetween. Said bridge members 45, are operatable by means of a grip 46, pivoted at the handle of the controlling lever to which it is attached.

Shown in Figs. 1 and 2, the lateral control cables 47, and longitudinal control cables 48, are connected respectively to the warping tips and the rear elevator of the plane. The ends of said cables are each connected to the respective adjusting surface which it is desired to operate. The cable 47, is led around the idler 49, and after being wound a few times about the pulley 50, rigidly connected to the lever 39, it passes to the drum 51, and is there wound about the same a sufficient number of times to prevent slipping, and the ends of the cable are securely attached to the ailerons or warping tips of the main plane. Both ends of the cable 48, are securely attached to the rear elevator 52, and the cable is then led to, and wound about the drum 53, and the pulley 54, the latter of which is rigidly connected to the lever 40, as similarly described in the foregoing, with reference to the cable 47. Thus it will be seen that the levers 39 and 40, are both constrained to move with every movement of the drums 51 and 53, due to the non-slipping cable connections existing therebetween.

As shown in Fig. 14, the engine shaft is provided with a worm 54ª, which meshes with the worm gear 55, on the transverse shaft 56. Said shaft is journaled in bearings 57, suitably mounted upon the vehicle frame, and near one end of said shaft is rigidly keyed thereon a gear wheel 58, and intermediate the ends of the shaft and facing one another and keyed on said shaft, are the bevel pinions 59 and 60. Mounted in a suitable frame 61, are two parallel shafts, the extremities of which are provided with the bevel pinions 62 and 63, each meshing with the bevel pinions 59 and 60 respectively to drive said parallel shafts in opposite directions. Also mounted in said frame 61, and in axial alinement with the shaft bearing the bevel pinions 62 and 63, respectively, are parallel shafts provided at their ends with the gears 64 and 65, each meshing at all times with the gear 66, rigidly connected to the drum 51, on the drum shaft 67. A magnetic clutch affords means of connection between the axially alined shafts, thus providing a means of driving the drum in either direction.

As shown in Fig. 11, a faced wheel 67ª, is provided with a series of electro-magnets 68, all connected to one another, one terminal of which is grounded, and the other of which is led to a suitable collecting ring 69, which is contacted by a brush 70. A grounded wire 77, and a wire 78, connected to the brush 70, are led respectively to one of the quadrant members adjacent the lever 39, and to one of the contact members 19ª, of the mercury bowl. Feathered on the same shaft bearing the gear 64, is a cup member 70ª, provided on its inner face with the magnetic plate 71, thus permitting the cup member to slide on its shaft due to the attraction of the electro-magnets 68, bringing the plate 71, into close contact with the plate 72, which is rigidly connected to the magnet 68. Said plate 71, is provided with radially directed V shaped teeth, adapted to be engaged by complementally shaped teeth arranged in groups on the plate 72, each group centered above one of the coils of the electro-magnets. The shape of the teeth serves to throw the cup member out of engagement when the current through the magnets is broken, inasmuch as the shaft bearing the magnets is rotating continuously. The operation of the other clutch member driven by the gears 60 and 63, is identical, the only difference being that the alined shafts serve to rotate the drum in the opposite direction. A similar arrangement of magnetic clutches is shown for driving the drum 53, and for this purpose the parallel magnetic clutch shafts are provided with the intermeshing gears 73 and 74, the latter of which is in mesh with the gear 58, so that the aforesaid magnetic clutch shafts are constantly rotating and in opposite directions.

Referring to Figs. 3 and 21, 75 indicates a suitable source of electro-motive force, one terminal of which is connected with the finger or brush 20ᵇ, and the current is thereby conducted to the finger 20, through the proper contact rings and fingers, and the other terminal 76, divides into two branches and is connected to one of the quadrant members of each of the pairs of quadrant members 44, adjacent the control levers 39 and 40 respectively. Wires, 77, lead from the other arc member of each of the pairs 44, each wire dividing into two branches, and each of said branches is connected to one of the terminals of each of the respective pairs of magnetic clutches. The four remaining terminals, one on each of the clutches, are connected by means of the wires 78, 79, 78ª, and 79ª, respectively to the four contact fingers 19, 19, and 19ª, 19ª, in the mercury bowl. Thus it will be seen that although the driving shaft for the magnetic clutch is continuously driven, the clutch members are only caused to engage when the mercury bowl is tipped to complete one of the electric circuits, and when such is the case, one or both of the drums 51 or 53, being caused to rotate in the proper direction, immediately effects the adjustment of the controlling surfaces of the plane.

The operation is as follows: Before starting a flight, the operator adjusts the levers 32 and 32ª, to a central position and the stabilizing mechanism will then keep the machine in equilibrium in a horizontal plane, but after sufficient speed is attained to enable the machine to leave the ground, the operator may adjust the lever 32, which, tilting the stabilizing bowl about an axis transversely the machine, will complete the electrical circuit through the rear finger 19, and the finger 20, thus energizing one of the magnetic clutches to drive the drum 53, which adjusts the elevating mechanism of the machine until the machine is inclined at the desired angle for climbing. When the machine has reached this angle, the stabilizing bowl being held in an inclined position relative the machine, the bowl will now be in level or normal position relative the earth and the electrical circuits will be broken provided the machine maintains a true course. Should, however, the machine for any reason whatsoever deviate through a lateral or longitudinal angle, the mercury level in the bowl changing its relative position therein will complete certain of the electrical contacts through the fingers 19 or 19ª, as the case may be, whereupon the proper magnetic clutches being energized, will cause rotation of the respective drums, thereby effecting adjustment of the controlling surfaces of the machine.

It is readily seen that practically any adjustment desired may be effected to guide the machine in the predetermined path independently of the operator. For instance, if it is desired to traverse a spiral path, the lever 32ª, is adjusted to a certain position, whereupon through the agency of the stabilizing mechanism the warping surfaces or ailerons will be adjusted to maintain the machine at a certain banking angle; the lever 41, is set at a certain position thus causing the machine to describe a circular path in a horizontal plane; the lever 32, is then placed in a certain position, which, through the agency of the stabilizing mechanism, will cause the machine to assume a certain longitudinal angle of inclination, and the machine will continue to climb in such a path until the adjustment of the levers is changed.

It is a well known fact, and sometimes advisable in aeroplane constructions, to dispense with the lateral control lever 39, and to connect the lateral control directly to the lever 41, thus simplifying the operation of the controls of the machine. However, should an emergency arise requiring the instant attention of the operator, the levers 39 and 40 may be operated directly, and this, due to the engagement of the grip 46, by the hand of the operator, will raise the bridge member 45, thereby breaking the circuits and permitting the machine to be operated independently of the stabilizing mechanism.

Of course, it is to be understood that while I have described the invention with reference to an aeroplane or heavier-than-air flying machine, the device is particularly appropriate and applicable to a submarine vessel or torpedo or, in fact, any vehicle, not constrained to move in a certain path by fixed means governing such movement, and may even be utilized to assist in preventing lateral and longitudinal rolling and plunging of a vessel at sea. Of course, when so installed, the particular mechanism operated by the stabilizing device will vary in accordance with the character of the installation, that is to say, the invention when installed on a flying machine, is connected to operate the wings, or elevator or tail, while upon marine installation, for example, submarine vessels, the mechanism would vary, as lateral and longitudinal stabilizing propellers or rudders or planes would be controlled thereby. I have not, however, deemed it necessary to illustrate all the manifold and various purposes to which my invention may be applied, inasmuch as its utility for said various purposes will be readily understood. I have therefore illustrated but a preferred embodiment of my invention, and I do not purpose limiting the patent granted on this application otherwise than necessitated by the prior art.

I claim as my invention:

1. The combination with an aeroplane, of stabilizing mechanism comprising a mercury cup, a plurality of electrical contacts therein, means inclining said mercury cup at any desired angle, a plurality of drums disposed at right angles to one another adapted to receive the respective lateral and longitudinal controlling cables of the aeroplane thereabout, a shaft driven from the engine of said aeroplane, gears thereon adapted to transmit a drive to said drums in either direction, and a plurality of sets of magnetic clutches associated with said drums adapted to be thrown into operation by the closure of said contacts within said mercury cup to cause rotation of said respective drums, the axes of each set of clutches parallel to the axis of the respective drums driven thereby.

2. In a device of the class described, a plurality of drums adapted to receive the longitudinal and transverse controlling cables of an aeroplane wound thereabout, independent manually operated means, one for said lateral and one for said longitudinal controlling cables for actuating said cables, gears adapted to drive said drums in either direction, gearing connected to the power plant of the aeroplane to drive said drum gears, sets of magnetically operated clutches interposed between said respective sets of gearing acting when energized to cause rotation of said drums thereby for actuation of either or both of said longitudinal and transverse controlling cables, and mechanisms, one for each of said means adapted to cut out of operation either or both of said sets of clutches according to which of said manually operated means are operated.

3. In a device of the class described, a plurality of drums adapted to receive the controlling cables of an aeroplane thereabout, a constantly driven driving means for said drums, a plurality of sets of magnetically operated clutches interposed between said drums and the driving means therefor, mechanism on the aeroplane adapted to close electrical circuits to cause operation of said respective clutches and rotation of said drums therewith when said aeroplane is diverted from its course, and a plurality of hand operated means for actuating said cables arranged to break the electrical circuit between said mechanism and either or both of said sets of clutches when said means are operated.

4. In a device of the class described, a power plant for an aeroplane, a shaft driven thereby, a plurality of pairs of parallel clutch shafts constantly driven by said latter shaft, one pair of said parallel clutch shafts disposed at right angles to the others, drums adapted to be driven by said clutch shafts, controlling cables for an aeroplane wound about said drums, magnetically operated clutches disposed on each of said clutch shafts, and universally mounted means on the aeroplane to bring said respective clutches into operation to properly guide the aeroplane when the same is diverted from a predetermined course.

5. In a device of the class described, mechanism for controlling the movement of a vehicle, automatically acting fluid controlling means for causing actuation thereof, a gimbal mounting for said controlling means, and devices for adjusting and retaining said fluid controlling means adjusted in different positions by adjustment of said gimbal mounting.

6. In a device of the class described, an aeroplane, a universally adjustable stabilizing element mounted thereon, a plurality of independently operatable levers for longitudinal and lateral control of said aeroplane, means connected to said levers adapted to cut said stabilizing element out of operation, and mechanisms for adjusting said stabilizing element at any desired angle and maintaining the same therein.

7. In a device of the class described, an aeroplane, a mercury cup mounted thereon, electrical contacts therein, a gimbal mounting for said mercury cup, mechanism for inclining said cup at various angles and retaining the same therein, a plurality of brushes mounted on said mercury cup, a plurality of contact rings mounted on said gimbal mounting adapted to be contacted by said brushes in all positions of said cup, and magnetically controlled drums adapted to actuate the controlling cables of said aeroplane, when said mercury cup is tilted due to a diversion of said aeroplane from its predetermined course.

8. In a vehicle, lateral and longitudinal means for governing the movement thereof, automatically acting mechanism acting to operate said governing means to maintain the vehicle in the path of movement, manually operatable devices for actuating and adjusting said mechanism, and a plurality of independent manually operated mechanisms for said vehicle adapted to automatically disconnect said automatic mechanism from either or both of said governing means when either or both of said manually operatable mechanisms are actuated.

9. In a device of the class described, the combination with an aeroplane of a universally adjustable cup, electrical contacts therein, mercury in said cup adapted to close said electrical contacts, a plurality of means for adjusting said cup, a plurality of controlling cables for said aeroplane, a plurality of drums about which said cables are wound to actuate said controlling mechanisms, a plurality of sets of clutch shafts driven from the power plant of said aeroplane, a plurality of sets of magnetic clutches disposed on said clutch shafts and adapted to be actuated from said mercury cup when the electrical contacts are closed, to cause actuation of the proper controlling cables of said aeroplane, and a plurality of mechanisms for disconnecting different sets of said clutches from said mercury cup contacts.

10. The combination with an aeroplane, of a universally adjustable mercury cup mounted thereon, a plurality of independently operating means for adjusting and maintaining said cup in any desired position, electrical contacts in said cup adapted to be closed by the mercury therein when said cup is tilted, a plurality of clutch shafts disposed at right angles to one another, a shaft driven from the power plant of said aeroplane adapted to drive all of said clutch shafts simultaneously, a plurality of magnetic clutches disposed on said clutch shafts and adapted to be thrown into operation respectively when the respective contacts in said mercury cup are closed, means connected to said clutch shafts adapted to be thrown into operation respectively when the respective contacts in said mercury cup are closed, and means connected to said clutch shafts adapted to operate the guiding mechanism of said aeroplane.

11. In a device of the class described, an aeroplane, a stabilizing bowl adjustably mounted thereon, adjustable electrical connections associated therewith, means adjusting said bowl to any desired position, electrical contacts in said bowl connected with said electrical connections adapted to be closed when said bowl is tilted from adjusted position, a plurality of drums disposed transversely and longitudinally of said aeroplane, longitudinal and transverse controlling cables of said aeroplane wound thereabout respectively, a jack shaft continually driven by the power plant of said aeroplane, a plurality of clutch shafts continuously driven by said jack shaft, and a plurality of magnetic clutches disposed on said clutch shafts and adapted to be thrown into operation by a closure of said electrical contacts in said stabilizing bowl to cause rotation of said respective drums to automatically guide the aeroplane.

12. In an aeroplane of the class described, mechanism for governing the movement thereof, universally adjustable means acting automatically to counteract the movement of the aeroplane other than in a predetermined path, a plurality of sets of parallel means disposed at right angles to one another controlled by said adjustable means for regulating said mechanism, and a plurality of devices adapted to be operated independently of one another to cut out the adjustable means from either one of or all of said sets of means.

13. In a device of the class described, an aeroplane, a universally adjustable stabilizer therefor, means governed thereby for controlling the movement of said aeroplane, and a plurality of independently operatable mechanisms for adjusting said stabilizer at various angles and maintaining the same adjusted to control the lateral and longitudinal movement of the aeroplane.

In testimony whereof I have hereunto subscribed my name in the presence of two subscribing witnesses.

ALFRED J. MACY.

Witnesses:
 LE ROY D. KILEY,
 GEORGE R. MOORE.